United States Patent [19]

Pipkins

[11] Patent Number: 5,666,558
[45] Date of Patent: *Sep. 9, 1997

[54] BIDIRECTIONAL PARALLEL PROTOCOL HAVING COMPUTER INDICATES TO THE PRINTER THE ACCEPTABLE DATA FORMAT FOR DATA TRANSFER

[75] Inventor: Jeff D. Pipkins, Spring, Tex.

[73] Assignee: Compaq Computer Corporation, Houston, Tex.

[*] Notice: The term of this patent shall not extend beyond the expiration date of Pat. No. 5,507,003.

[21] Appl. No.: 582,524

[22] Filed: Jan. 3, 1996

Related U.S. Application Data

[63] Continuation of Ser. No. 338,885, Nov. 14, 1994, Pat. No. 5,507,003, which is a continuation of Ser. No. 750,625, Aug. 27, 1991, abandoned.

[51] Int. Cl.[6] .................................................. G06F 13/00
[52] U.S. Cl. .................. 395/851; 364/235.7; 364/260.1; 364/265.1; 364/235; 364/DIG. 1; 364/930; 364/935.3; 395/114
[58] Field of Search ..................................... 395/851, 823, 395/275, 114, 325, 101, 112, 113, 181, 182.1; 371/12; 364/DIG. 1, DIG. 2

[56] References Cited

U.S. PATENT DOCUMENTS

| | | | |
|---|---|---|---|
| 4,388,686 | 6/1983 | Haid | 395/325 |
| 4,635,222 | 1/1987 | Tokui et al. | 395/114 |
| 4,703,450 | 10/1987 | Sueyoshi et al. | 395/275 |
| 4,720,813 | 1/1988 | Kaneko | 395/275 |
| 4,745,602 | 5/1988 | Morrell | 371/12 |

FOREIGN PATENT DOCUMENTS

A22202   3/1989   Australia.

OTHER PUBLICATIONS

I.B.M. Technical Disclosure Bulletin; "Query Printer Status"; vol. 33, No. 3B, pp. 88–89, Aug. 1990.
I.B.M. Technical Disclosure Bulletin; "Printer Interface"; vol. 26, No. 11, pp. 5783–5784. Apr. 1984.
Advanced System Logic Spotlight Ad.

Primary Examiner—Meng-Ai T. An
Attorney, Agent, or Firm—Jenkens & Gilchrist, PC

[57] ABSTRACT

A protocol provides bidirectional communication capability between a host computer and a printer over a parallel interface, the host computer and the printer having a forward channel therebetween for the transfer of signals from the host computer to the printer. The protocol includes conventions for turning the forward channel around so as to establish a reverse channel to allow transfer of data from the printer to the host computer, conventions for controlling the transfer of data from the printer to the host computer over the reverse channel, and conventions for turning the reverse channel back around so as to re-establish the forward channel.

9 Claims, 3 Drawing Sheets

BIDIRECTIONAL PARALLEL PROTOCOL HAVING COMPUTER INDICATES TO THE PRINTER THE ACCEPTABLE DATA FORMAT FOR DATA TRANSFER

This application is a continuation of application Ser. No. 08/338,885, filed Nov. 14, 1994 U.S. Pat. No. 5,507,003; which is a continuation of Ser. No. 07/750,625, filed Aug. 27, 1991, now abandoned.

BACKGROUND OF THE INVENTION

1. Field of the Invention

The present invention relates to protocols and, more particularly, to protocols that enable bidirectional communication through a parallel interface.

2. Description of Related Art

Ports are well known to those skilled in the electronic arts as places of access to a device or network where energy may be supplied or withdrawn or where the device or network variables may be observed or measured. Ports may be classified into one of two categories: serial, or parallel. As may be expected, serial ports involve time sequential processing or handling, and parallel ports involve simultaneous processing or handling.

Within the microprocessor arts the term "ports" encompasses "gates" or openings for data to pass from the outside world to the microprocessor system, or vice versa. Microprocessors include both serial and parallel ports. Historically, the serial port has been widely recognized to be useful in communicating with modem, WANS and the like, and a large variety of software has been developed that supports serial communication. Parallel ports, on the other hand, have traditionally been used only for relatively mundane tasks such as printing and plotting, primarily because they have been perceived as being unidirectional only.

Recently it has begun to be appreciated among those skilled in the art that a standard parallel port is bidirectional, that is, you can input or output on as many as twelve lines simultaneously. A serial card, on the other hand, can only input or output on a single line, one bit at a time. Comparing operation of the two reveals the relative power of the parallel port: it can output a byte and a half in the time it takes a serial port to determine whether it is time to cause a singular transaction.

Also very recently it has begun to be appreciated by those skilled in the art that there are certain advantages to using a parallel port for the sort of communication normally associated with a serial port. A number of these advantages are expressed by Ross Greenburg in a article entitled "Adapting the Parallel Port for Bidirectional Communication", which article can be found beginning on page 107 of the September 1990 issue of the *Microsoft Systems Journal*. In that article Mr. Greenberg points out that communication does not always need to be performed in ASCII. Examples of such occasions would be when the ON/OFF condition of a sensor is being read or when a wire to a relay is turned ON or OFF. It is wholly unnecessary to use a serial port in such cases—the real world can be very easily connected to a parallel port. Mr. Greenberg also notes that because a parallel port is able to get multiple bits in or out simultaneously, it should be able to provide faster I/O than a serial port. Of course, special code and protocols, such as the protocol taught herein, are required to take full advantage of the capabilities of a parallel port.

As the present invention specifically deals with communication involving a printer, it is appropriate to consider communication with such printers as part of the related art. In order to fully exploit the capabilities of a printer, such as a PostScript printer, a host computer must be able to send queries and receive the corresponding replies. Of course, as previously mentioned, bidirectional communication, here between a host computer and a printer, can be provided by a serial interface. However, as only very recently recognized, bidirectional communication at much higher speeds may also be provided by a parallel interface. Those skilled in the art have not yet tapped this latter capability to provide users of host computer and printer systems the functionality of the serial interface without sacrificing the ease of installation and higher transfer speeds of the parallel interface. Accordingly, it is a shortcoming and deficiency of the prior art that no one has heretofore developed a viable protocol to allow bidirectional communication between a host computer and a printer over a parallel interface.

SUMMARY OF THE INVENTION

The present invention overcomes the shortcomings and deficiencies of the prior art by providing a protocol for providing bidirectional communication capability between a host computer and a printer over a parallel interface, the host computer and the printer having a forward channel therebetween for the transfer of signals from the host computer to the printer. The protocol includes means for turning the forward channel around so as to establish a reverse channel to allow transfer of data from the printer to the host computer, means for controlling the transfer of data from the printer to the host computer over the reverse channel, and means for turning the reverse channel back around so as to re-establish the forward channel.

In embodiments of the present invention the means for turning the forward channel around is activated by the host computer. In those same and also in other embodiments of the present invention the means for turning the reverse channel beck around so as to re-establish the forward channel is activated by the host computer.

In certain embodiments of the present invention the forward channel includes status lines which are used to transfer data between the printer and the host computer during reverse channel operation Further according to the teachings of the present invention the forward channel my be an input/output control channel which my be used to transfer control and status information between the printer and the host computer during reverse channel operation.

In embodiments of the present invention the means for turning the forward channel around is a means for the host computer to raise a *SLCTin signal and a means for the printer to lower a SLCT signal.

Still further according to the teachings of the present invention the means for controlling transfer of data may be a means for the host computer to request a packet of data, a means for the printer to indicate a packet of data is on the status lines, and a means for the host computer to read the packet of data from the status lines. In such embodiments of the present invention the packet of data may be a nibble of data, the means for the host computer to request a nibble of data may be a *STROBE signal, and the means for the printer to indicate a nibble of data is on the status lines may be a SLCT signal. In such embodiments a low nibble of data may be requested via a lowered *STROBE signal and indicated to be transmitted via a raised SLCT signal; further, a high nibble of data may be requested via a raised *STROBE signal and indicated to be transmitted via a lowered SLCT signal.

Embodiments of the present invention may also include means for the printer to indicate to the host computer how many bytes of data are susceptible to be transmitted from the printer to the host computer. This means may be designed to act in response to the *SLCTin signal being raised and prior to the SLCT signal being lowered.

The present invention also overcomes the shortcomings and deficiencies of the prior art by providing a method for providing bidirectional communication capability between a host computer and a printer over a parallel interface, the host computer and the printer having a forward channel therebetween for the transfer of signals from the host computer to the printer. The method provided by the present invention includes the steps of turning the forward channel around so as to establish a reverse channel to allow transfer of data from the printer to the host computer over the reverse channel, and turning the reverse channel beck around so as to reestablish the forward channel.

In embodiments of the method of the present invention either or both of the channel turning steps may be activated by the host computer.

According to the teachings of the present invention, the forward channel may include status lines which may be used to transfer data between the printer and the host computer during reverse channel operation Further according to the teachings of the present invention, the forward channel may be an input/output control channel which may be used to transfer control and status information between the printer and the host computer during reverse channel operation.

In embodiments of the method of the present invention the step of turning the forward channel around may include the step of the host computer raising a *SLCTin signal and the step of the printer lowering a SLCT signal.

Still further according to the teachings of the present invention the step of controlling transfer of data may include the step of the host computer requesting a packet of data, the step of the printer indicating a packet of data is on status lines, and the step of the host computer reading the packet of data from the status lines. In such embodiments of the method of the present invention the packet of data may be a nibble of data. Further, in such embodiments of the method of the present invention the step of the host computer requesting a nibble of data may involve a *STROBE signal. Still further, in such embodiments of the method of the present invention the step of the printer indicating a nibble of data is on status lines may involve a SLCT signal. In embodiments as described above, a "low" nibble of data may be requested via a lowered *STROBE signal and indicated to be transmitted via a raised SLCT signal and, further, a "high" nibble of data may be requested via a raised *STROBE signal and indicated to be transmitted via a lowered SLCT signal.

Embodiments of the present invention may also include the step of the printer indicating to the host computer how many bytes of data are susceptible to be transmitted from the printer to the host computer. In such embodiments of the method of the present invention, this step may occur in response to the *SLCTin signal being raised and prior to the SLCT signal being lowered.

Accordingly, it is an object of the present invention to provide a bidirectional parallel protocol.

Another object of the present invention is to provide a protocol that can use existing PC parallel port hardware and cables.

Yet another object of the present invention is to provide a protocol having a host computer and a printer portion, which portions do not disrupt unilateral transmission when a protocol-equipped host computer or printer is connected to a non-protocol-equipped printer or host computer.

Still yet another object of the present invention is to provide a protocol that is transparent to ill-behaved software that drives the parallel port directly.

A further object of the present invention is to provide a protocol wherein the host computer can poll the printer quickly and efficiently to see if there is any data to be read.

Another object of the present invention is to provide a protocol that does not impose real-time constraints on the host computer.

Still yet another object of the present invention is to provide a robust, expandable protocol.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE INVENTION

Figure 1:
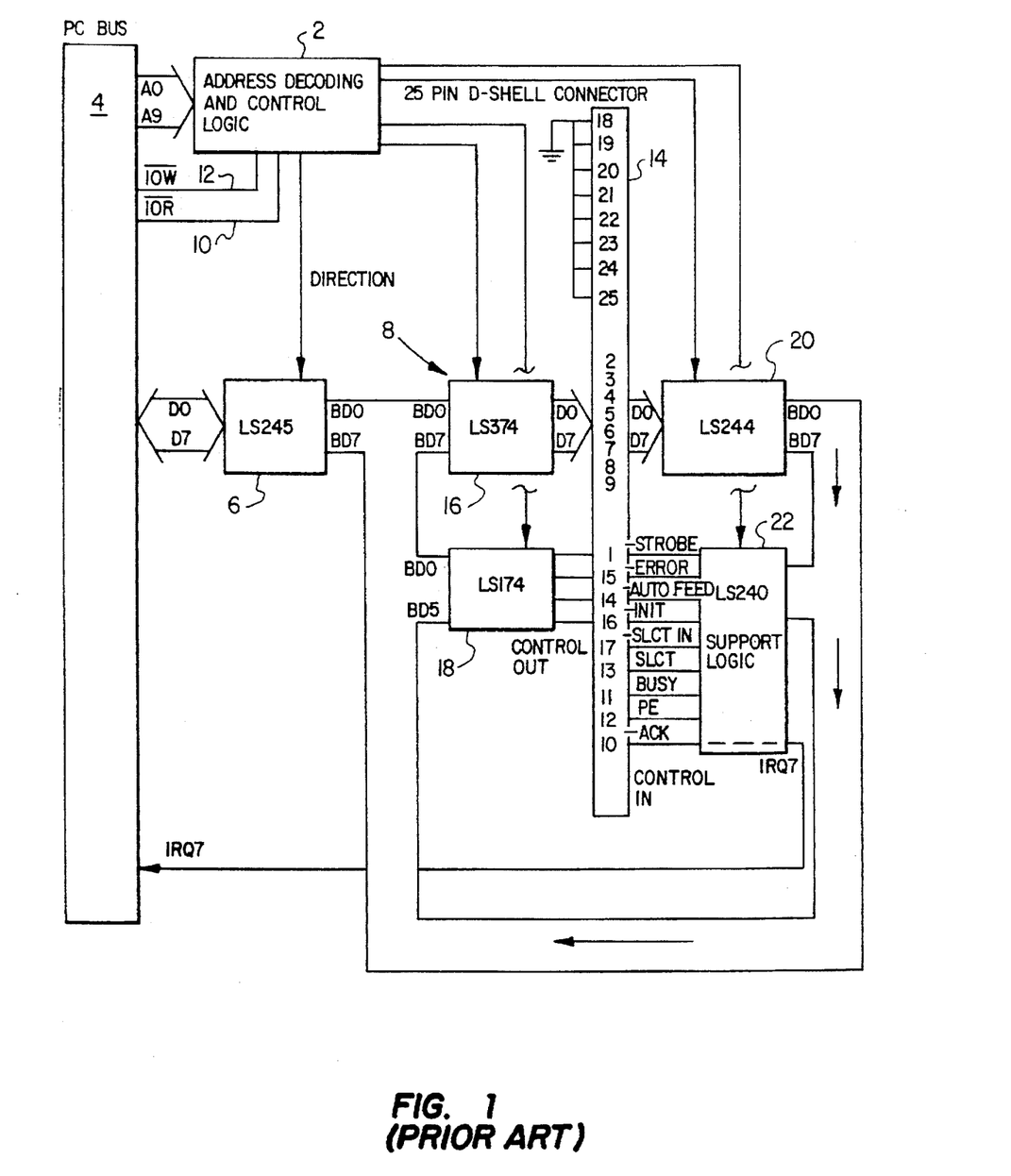
FIG. 1 is a block diagram of a prior art parallel printer adapter.

Referring now to the drawings wherein like or similar elements are designated with identical reference numerals throughout the several views, and more particularly to FIG. 1, shown therein is a heretofore developed parallel printer adapter. This FIG. 1 clearly shows a number of details significant to the structure and practice of the present invention.

First, with special reference to FIG. 1, it may be noted that a parallel port is one of the simplest components of a computer. There are four distinct parts of such a port: an address decoding portion, a write logic portion, a physical input/output portion; and an input/output to bus transfer portion. In general, operation of the parallel port is as follows.

First, the address decoding portion 2 is activated when a specific address is on a bus 4. The write logic portion 6 takes the data on the bus 4 and gives it to the physical input/output portion 8. The input/out-put to bus transfer portion makes the data from the input/output available to the bus when it is requested.

Four addresses enable the parallel port, together with the $\overline{IOR}$ or $\overline{IOW}$ bus lines 10, 12. The $\overline{IOR}$ and $\overline{IOW}$ bus lines 12, 14 indicate that a port input or output operation is taking place on the bus. Because normal memory reads and writes do not set the pins associated with these lines, the overall card ignores these types of operations.

The various combinations of wires allow for writing and reading the status and data lines on the DB-25 connector 14.

Figure 2:
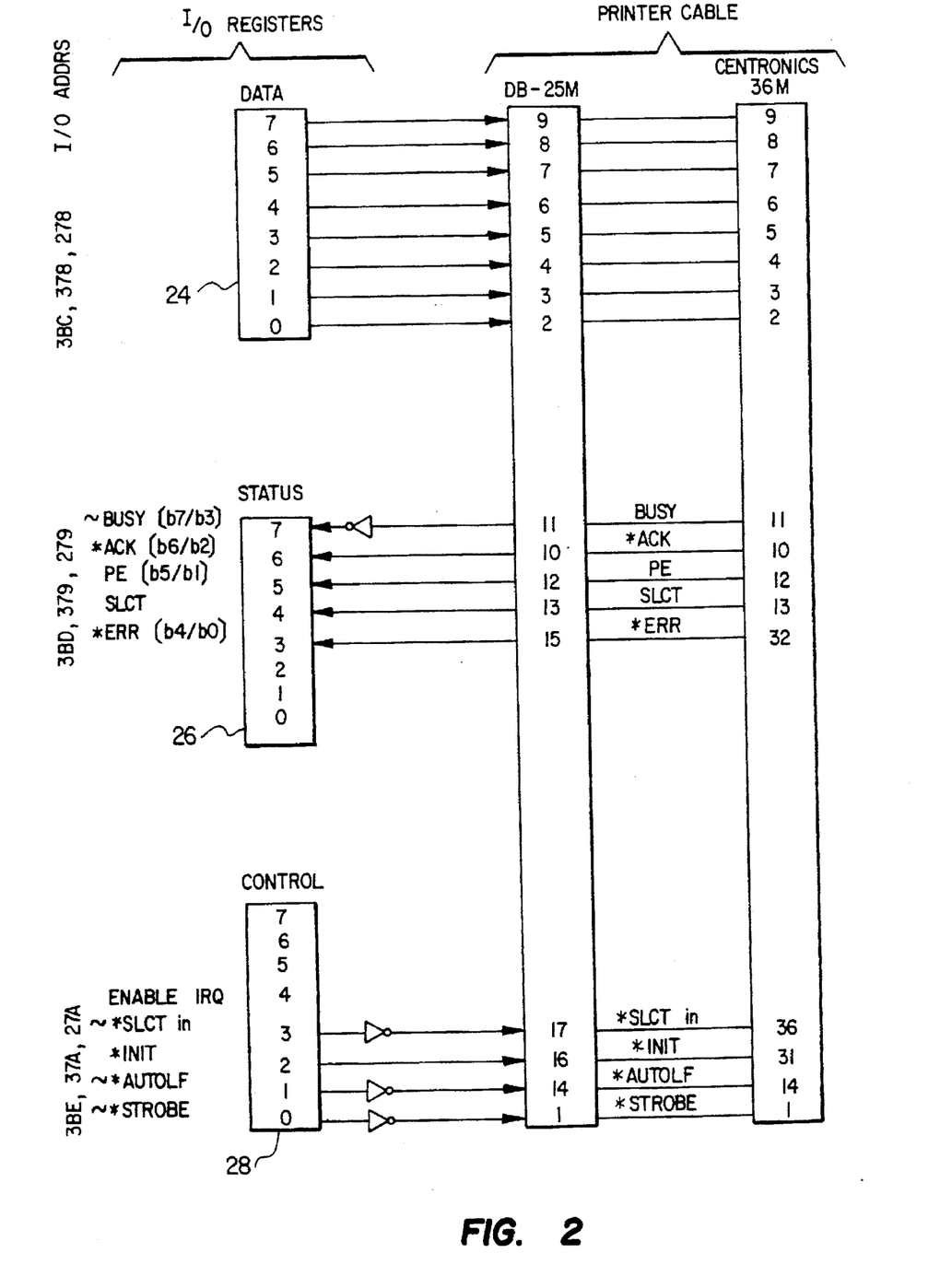
FIG. 2 is a diagram showing details of a parallel port interface.

Referring now to FIG. 2, there is shown in block form the hardware and cable of a PC parallel port interface. This interface may be seen to have three registers, all of which are directly manipulated by software. These three registers are a data register 24, a status register 26, and a control register 28. Each of these three registers 24, 26, 28 is discussed in an individual paragraph immediately below.

The data register 24 is an 8-bit read/write latch for output only. The latch can be read to determine the data most recently written to it. Although some schemes have heretofore been proposed for tricking this latch into being used for input, these schemes have been unreliable at best and hardware damaging at worst.

The status register 26 is not actually a register, but rather is an unlatched port for input. The term "status register" is used herein to prevent confusion over the term "port". To "read the status register" should be understood herein to mean to take a real-time sample of the status lines.

The control register 28 is similar to the data register 24 in that it is also a read/write latch for output only. The three unused bits in the upper part of the register 28 are traditionally read as ones, but should be written beck as zeros. This prevents malfunction with certain newer implementations that use bit 5. Bit 4 is not actually a printer control line; it is used to enable/disable the interrupt.

The polarity of the status and control lines can be a major source of confusion. To make matters worse, some of the lines are inverted at the interface. A good naming convention can save an implementor a lot of time and trouble.

An active-low signal is a condition indicated by low voltage rather than high voltage. We say that the *ACK signal is active low, because a low voltage on that line indicates an acknowledgement from the printer. The asterisk (*) is part of the name, and serves as a reminder that the signal is active-low.

The PC parallel port interface inverts the BUSY signal and makes the result available as bit 7 of the status register 26. We will call this bit ~BUSY. This tilde (~) indicates that the signal is inverted with respect to the cable. The ~*STROBE, ~*AUTOLF, and ~*SLCTin signals are both active low and inverted with respect to the cable.

It should be appreciated that some signals can be referenced in more than one way. For example, to say that *SLCTin is lowered is the same as saying that ~*SLCTin is raised. Discussions of the protocol usually reference the signal as it appears on the cable, rather than as it appears on the PC interface.

Another potential source of confusion is the cable itself, simply because in the example shown in FIG. 2 it has a DB-25 male connector on the PC end, and a Centronics 36-pin male connector on the printer end. For example, reference to a "pin k" is ambiguous because the connectors are not one-to-one. FIG. 2 is, therefore, a programmer's quick-reference guide to a PC parallel port. It shows the cable wiring with pin numbers for both connectors, the signal names associated with the wires, the registers accessible by the PC, and the inverters associated with the interface.

With the above background, a protocol according to the teachings of the present invention may now be discussed in detail. For reasons that will become apparent, this protocol may be called a "nibble-mode reverse channel protocol".

Conventionally, the transfer of data from the host to the printer is accomplished via the forward channel. The bidirectional protocol according to the teachings of the present invention establishes a reverse channel for transferring data from the printer to the host.

Transfer on the forward channel occur one byte at a time; each byte is transferred independently. The reverse channel is dialogue-oriented; any number of bytes (between 0 and 16384) can be transferred in a single dialogue.

Figure 3:
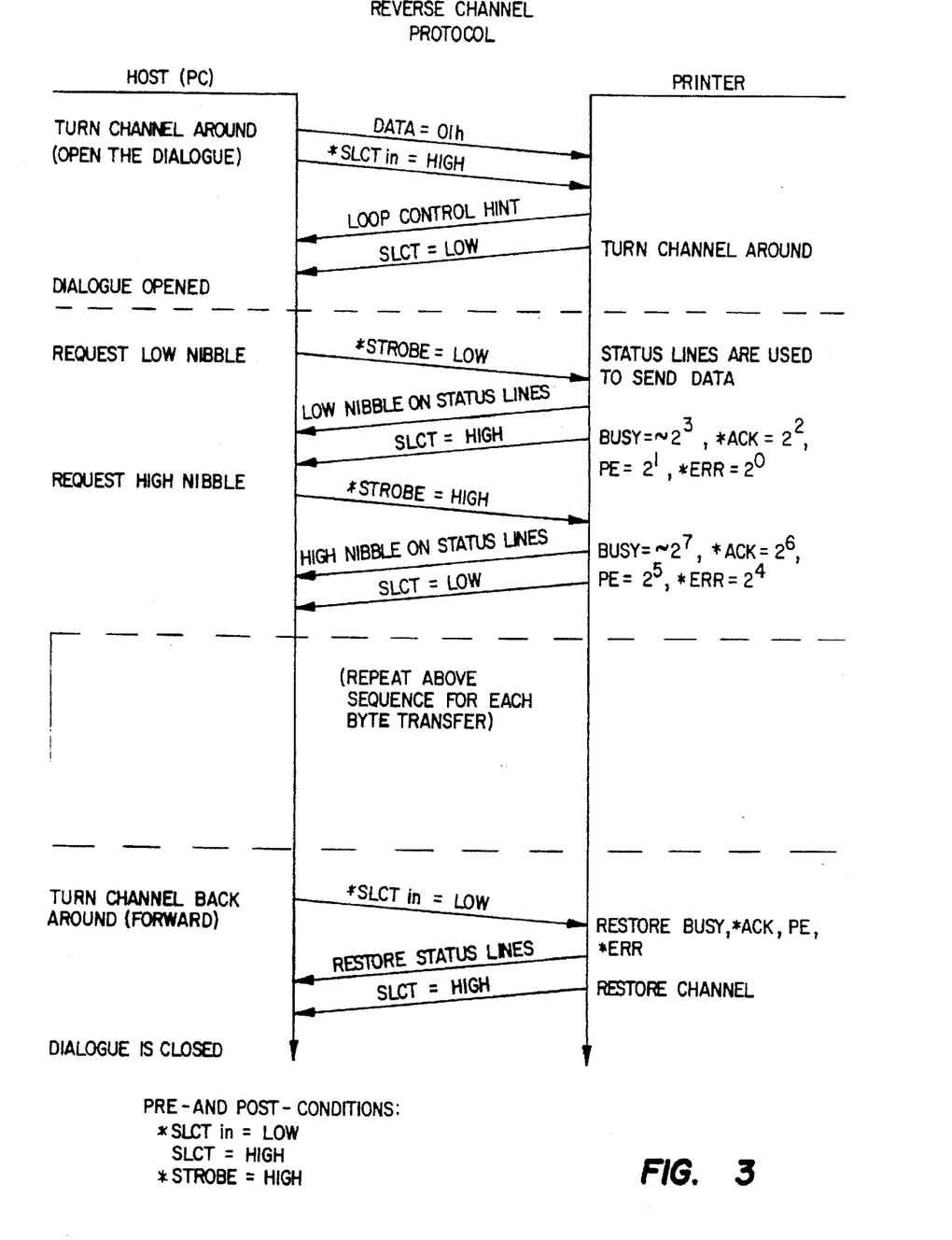
FIG. 3 is a diagram illustrating signal transmissions over time in a protocol according to the teachings of the present invention.

The dialogue has an opening sequence and a closing sequence for the purpose of changing the channel direction, or "turning the channel around". This is necessary because the two channels share certain signals whose meaning depends on which channel is active. There are not enough signals in the cable to allow both channels to be active simultaneously. FIG. 3 illustrates the reverse channel protocol.

Referring now to FIG. 3, it may be seen that the host initiates the dialogue by writing a hex 01 h byte to the data lines, and then raising (de-activating) the *SLCTin signal. The 01 h byte represent a communication mode number. Communication mode numbers will be discussed in greater detail hereinbelow.

The printer responds to the foregoing by placing a nibble of data, the loop control hint, on the status lines and then by lowering SLCT. When the host sees SLCT drop, it reads the status lines to get the loop control hint. This also is discussed further below. The dialogue is now open The next set of operations in a protocol according to the teachings of the present invention may be designated "data transfer loop operations". In this loop the host lowers *STROBE to request the low nibble of a byte. When SLCT goes high, the host can read the nibble from the status lines. In the example shown in FIG. 3, ~BUSY is bit 3, *ACK is bit 2, PE is bit 1, and *ERR is bit 0.

Next, the host raises *STROBE to request the high nibble of the byte. When SLCT goes low, the host can read the nibble from the status lines. In the example shown in FIG. 3, ~BUSY is bit 7, *ACK is bit 6, PE is bit 5, and *ERR is bit 4.

With respect to the loop control hint, which has been mentioned briefly heretofore, during the opening sequence the host reads the loop control hint from the status lines (in this example, ~BUSY is bit 3, *ACK is bit 2, PE is bit 1, and *ERR is bit 0). The loop control hint is a four-bit unsigned integer that establishes an upper limit on the number of bytes that can be transferred in the newly-opened dialogue.

If the loop control hint is 0 h, then the printer has no data to send, and the host is obligated to close the dialogue without attempting to transfer any data.

If the loop control hint is not 0 h, then the loop control limit is computed as 2 raised to the power (loop control hint-1). The following table enumerates all possible combinations:

| Loop control hint | Loop control limit (bytes) |
|---|---|
| 0h | 0 |
| 1h | 1 |
| 2h | 2 |
| 3h | 4 |
| 4h | 8 |
| 5h | 16 |
| 6h | 32 |
| 7h | 64 |
| 8h | 128 |
| 9h | 256 |
| Ah | 512 |
| Bh | 1024 (1KB) |
| Ch | 2048 (2KB) |
| Dh | 4096 (4KB) |
| Eh | 8192 (8KB) |
| Fh | 16384 (16KB) |

The host is not obligated to read all of the available bytes. The host may read any number of bytes from 0 to the loop control limit. If the host reads up to the limit, it must close the dialogue. If the host still wants more data, it may open another dialogue immediately. There may or may not be more data available.

As an example, suppose the host wants to read 80 bytes of data. Upon opening a dialogue, the host receives a loop control hint of 7 h, indicating that it may read no more than 64 bytes. The host reads the 64 bytes, closes the dialogue, and then opens another dialogue. Suppose this time the loop control hint is 6 h, indicating that 32 bytes are available. The host then reads 16 bytes (for a total of 80) and closes the dialogue.

The next, and bottommost, set of operations shown in FIG. 3 relate to closing the dialogue. It is the responsibility of the host to close the dialogue when it has read bytes up to the loop control limit, or when it has all the bytes it wants, whichever comes first.

The host closes the dialogue by lowering *SLCTin and then waiting for SLCT to go high. The host must wait for SLCT to indicate that the status lines now carry status information and not data.

As an aside with respect to the example nibble-mode reverse channel protocol being presented herein, it should be noted that although most printers lower SLCT whenever they go off-line for any reason, if a printer is to support the example protocol presented herein, it must not exhibit this behavior. The SLCT signal must be completely dedicated to the protocol, and should not be used for anything else. When the printer goes off-line, it should raise BUSY to prevent the host from sending data.

Another topic relating to the present invention that is appropriately discussed herein is protocol timeout errors. There are many places in the protocol where the host must wait indefinitely until a signal transition occurs. In these loops, a timer can be set to prevent hanging. The recommended timeout period is 2 seconds for each loop that is waiting on a signal transition from the printer. This should give the printer plenty of time to respond, yet allow the user to be notified promptly if the printer does not support the protocol at all.

If a wait loop on the host side times out while the dialogue is open, the host should attempt to close the dialogue. If a timeout occurs while closing the dialogue, then the host could reset the printer (using the *INIT pulse) to abort the dialogue. Upon receiving this signal, the printer may or may not take more drastic action, such as cancelling the current job. The host should always make sure that *SLCTin is low (active) before sending the *INIT pulse; if *SLCTin is high after the *INIT pulse, the printer will think that the host is trying to open a new dialogue. The host should never try to send data while a reverse channel dialogue is still open.

Now, with respect to host software, some 80×86 assembly-code fragments are presented hereinbelow to assist an implementor of the driver software on the host side. These code fragments are not included as part of the protocol specification, but are merely intended to provide efficient, non-obvious solutions in places where obvious solutions could be very inefficient.

A first fragment herein presented relates to reading the low nibble. When the PC reads the status register to get the low nibble of data, the bits are in the wrong order. This code fragment orders the bits correctly.

```
;Input:     AL has contents of status register. The data bits are
;           in the wrong order. Bit b3 of the data is in bit 7 of
;           the register, b2 is in bit 6, b1 is in bit 5, and b0
;           is in bit 3. Bit 4 will always have a 1 in it,
;           because when the low nibble was read, the SCLT line
;           was high.
;           So AL has [b3 b2 b1 1 b0 x x x ]
;Output:    AH has the low nibble with the bits in the proper
;           order, and the upper nibble is zeroed out.
;           So AH will have: [0 0 0 0 b3 b2 b1 b0 ]
    sub AL, 08h     ; Move b0 into bit 4 (Recall that bit 4 was 1)
                    ; We now have [ b3 b2 b1 b0 x x x x ]
    shr AL, 1       ;
    shr AL, 1
    shr AL, 1
    shr AL, 1
    mov AH, AL      ; Save in AH for later use. . .
```

A second fragment herein presented relates to reading the high nibble. When the PC reads the high nibble from the status register, the bits are again in the wrong order. This code fragment orders them properly and combines the high nibble with the low nibble.

```
;Input:     AL has contents of status register. The data bits are
;           in the wrong order. Bit b7 of the data is in bit 7 of
;           the register, b6 is in bit 6, b5 is in bit 5, and b4
;           is in Bit 3. Bit 4 is always 0, because when the high
;           nibble was read, the SLCT line was low.
;           So AL has: [ b7 b6 b5 0 b4 x x x ]
;
;           AH should have the low nibble: [ 0 0 0 0 b3 b2 b1 b0 ]
;
;Output:    Al will have the byte with all the bits properly
;           ordered.
;
    add AL, 08h; Move b4 into bit 4. (Recall that bit 4 was 0)
                    ; We now have [ b7 b6 b5 b4 x x x x ]
    and AL, 11110000b ; Mask out junk bits
    or AL, AH ; Combine nibbles to form a complete byte.
```

This third code fragment computes the number of bytes to be read by using the loop control hint and the number of bytes the host wants.

```
;Input:     BX has maximum number of bytes that the host wants to
;           read. (Limit imposed by the host).
;
;           AL has the value of the status register at the time
;           the loop control hint was transmitted. Bit 4 will be
;           0 because SLCT was low. [ b3 b2 b1 0 b0 x x x ]
;
;Output:    CX will have the number of bytes that should be
;           transferred before closing this dialogue.
;
;           BX will have the number of bytes that the host still
;           needs after the dialogue is closed. If BX is nonzero,
;           the host should open another dialogue and try to read
;           more bytes.
    add     AL, 08h ; We now have [ b3 b2 b1 b0 x x x]
    mov     CL, 4
    shr     AL, CL  ; We now have [ 0 0 0 0 b3 b2 b1 b0 ]
            ; AL has the loop control hint
    dec     AL      ; Any data available to read?
    ;       note that CX is NOT 0 here. Loop logic needs this
    ;       info.
    js      close_dialogue; CLOSE DIALOGUE IF NO
                    DATA AVAILABLE
    mov     CL, AL  ; Use loop control hint as shift count
    mov     AX, 1   ; Get a bit to compute 2^ (CL)
    shl     AX, CL  ; AX = 2^ (loop control hint - 1)
    ;       AX has the loop control limit
    ;       Compute minimum of BX and loop control limit (AX)
```

-continued

```
sub     AX, BX   ; CY if BX > AX; AX has delta
sbb     CX, CX   ; 0 if no CY, all's if CY
and     CX, AX   ; 0 or delta
add     CX, BX   ; CX has the minimum
sub     BX, CX   ; BX >= 0
;       CX has count for transfer loop. Use the loop
;       instruction.
;       BX has number of bytes the host lacks after the loop.
;       The host will want to use two nested loops, one for
;       the actual data transfer, and another to use as many
;       dialogues as needed to get enough data to satisfy the
;       host, or until a dialogue says there is no more data.
;       The loop logic goes something like this;
read_loop:
        [ Code to transfer a byte goes here. ]
        [ Preserve CX and BX ]
        loop read_loop
        ; Note that CX is 0 here...
        ; Host is obligated to close the dialogue now.
close_dialogue:
        [ Code to close the dialogue goes here. ]
        [ Preserve CX and BX ]
        ; If BX > 0, open another dialogue and read more data.
        or BX, BX
        jz xfer_done ; If BX is 0, host is satisfied.
        ; BX has number of bytes host still lacks
        ; CX is nonzero if there is no more data available.
        ; If CX is 0, there might be no more data.
        jcxz open_dialogue
xfer_done:
        ; If BX is 0, the desired number of bytes was red.
        ; If BX > 0, (N − BX) bytes were read, id N is the number
        ; of bytes that were desired.
```

To this point, only a so-called nibble-mode reverse channel protocol has been discussed. The nibble-mode reverse channel protocol, as has heretofore been indicated, is just one of a set of protocols designed for bidirectional parallel communications. Other such protocols are also disclosed in this document.

With respect to the protocol heretofore discussed, the following four communication mode numbers have been assigned:

| Mode Number | Protocol |
| --- | --- |
| 0 | Version ID protocol |
| 1 | Nibble-mode reverse channel protocol |
| 2 | IOCTL write mode |
| 3 | IOCTL read using nibble-mode rev. ch. protocol |

The remaining mode numbers 4-255 can be considered to be reserved for future use.

With respect to opening and closing a communication mode, each communication mode begins and ends in the same manner. To open a communication mode, the host puts the communication mode number on the data lines and then raises the *SLCTin signal. The printer acknowledges the mode by lowering the SLCT signal. All communications proceeding from this point must be according to the specified protocol. If the status lines are to be changed from their standard meanings, this change will happen before the SLCT signal is lowered. This allows the meanings of the status lines to be multiplexed based on the communication mode.

To close a communications mode, the host lowers *SLCTin and waits for the printer to raise SLCT to indicate that it is closed. The meanings of the status lines are stored after the host lowers *SLCTin and before the printer raises SLCT. The host must wait for the SLCT to be raised before proceeding to prevent possible race conditions.

Another protocol according to the teachings of the present invention, which is herein designated a "version ID protocol", will now be described.

Since the bidirectional parallel protocol is expandable, it helps if the host can determine what version of the protocol is being utilized by the printer, or if the printer doesn't support the protocol at all. The version ID protocol provides this functionality.

The version ID protocol works in exactly the same manner as the nibble-mode reverse channel parallel protocol except for a few very important differences. First of all, the communication mode number is zero (0) instead of one (1). So the host must put a hex 00 h on the data lines to begin.

The data read back is constant. The loop control hint will always be 2 h, so the loop control limit will always be 2. There will always be exactly two bytes to read. The first byte will be hex 5 Ah. The second byte will be the version number of the protocol.

The printer will be required to implement the protocol specified by the version number given in its entirety. Partial implementations will be non-conforming.

To clarify a point that might otherwise be ambiguous: the printer may return 1 for the version number and implement only communication modes 0 and 1, where mode 0 is the version ID protocol specified in a version of a document describing the protocol, and mode 1 is the reverse channel protocol specified in that same version of the document, so upward compatibility is maintained. The version 1 distinction is allowed for future printers that do not have an IOCTL channel.

It is now appropriate to discuss the IOCTL channel in some detail, beginning with a discussion of its purpose.

Often is it desirable or even necessary for host system software to interrogate the printer for detailed status information, or to send configuration commands. But the data stream to the printer (often from an unrelated application) cannot be disrupted by injecting new commands into it asynchronously. Likewise, it is not desirable for host system software to read data from the printer that was intended for an application in attempt to get status information. To complicate this matter, the printer's data buffer is likely to be full when the system software needs to send a status request.

The IOCTL (I/O control) channel provides a separate logical channel for communicating with the printer. This channel is bidirectional just like the data channel, so that information may be passed both ways. Separate buffers are maintained for this channel so that control and status information can be transferred even when data buffers are saturated.

The format of the information transferred on the IOCTL channel is defined by the printer. Basically, the IOCTL channel is used to transfer control and status information. It is not typically used for sending page descriptions or other data. The data channel is more appropriately used for this purpose.

To read from the IOCTL channel, the host uses the exact same protocol used for the nibble-mode reverse channel protocol, except that the communication mode number is 3. So to open the IOCTL channel for reading, the host first puts a hex 03 h on the data lines and raises *SLCTin, and the dialogue continues just as in communication mode 1.

The information read on this channel is logically separate from the data read using communication mode 1. If there is no data to be read from the reverse (data) channel, that does not imply anything about whether there is information to be read from the IOCTL channel.

To write to the IOCTL channel, the host must use communication mode 2. To begin the transfer, the host writes a hex 02 h on the data lines and then raises *SLCTin. The printer will then put the status of the IOCTL channel on the status lines, and lower SLCT. When the host sees SLCT go low, it knows that the status lines now reflect the status of the IOCTL channel, not the data channel. Thus, even if the data channel were busy, the IOCTL channel may not be.

Once communication mode 2 is opened, information is transferred from the host to the printer in the exact same fashion that data is transferred on the data channel, using the data lines, BUSY, *STROBE, *ACK, and the other status lines.

After the control information is transferred to the printer, the host must close the communication mode. The host lowers *SLCTin and waits for SLCT to go high. The printer will restore the status lines to reflect the status of the data channel, and then raise SLCT. The closing is complete when the host sees SLCT go high.

While writing data to the IOCTL channel, often the host will have to wait on BUSY, as is the standard convention This wait is not constrained by the same 2 second timeout that was discussed above for the nibble-mode reverse channel protocol. The timeout value here is left to the discretion of the host. If the host gets impatient waiting on the BUSY signal and decides to timeout, the host should first attempt to close the communication mode in the normal manner.

Moving to a new topic, the standard BIOS INT 17 h support for parallel printer communications is very limited in functionality. The following extensions are proposed to allow software to use the new protocols without re-implementing them. These extensions are proposed as examples only, to facilitate practice of the present invention but not to limit it.

The "identify version" function provides a way to tell that the following extended functions are available for use.
  Input:
    AX=80A5 h
  On return:
    AX is 5A5Ah
    BX will have the version number
The version number returned will correspond to the version number of an appropriate document describing the protocol. The version number is in the format "H.L." where the "H" portion is returned in BH and the "L" portion is returned in BL. The revision history at the beginning of the appropriate document should provide additional information on version numbers.

Ideally, all future changes to BIOS extensions will be upwardly compatible.

The "write data" function sends a buffer of data to the printer.
  Input:
    AX=8100 h
    DX=Printer port number (0 to 2 for LPT1 to LPT3)
    CX=Number of bytes to write
    DS:SI-->buffer of data
  On return:
    CX contains the number of bytes sent.
    Result code is in AX.
  If AX is 0: Successfully sent.
    -1: Invalid printer port number or port not installed.
    -2: The pointer specified is NULL.
    -3: Timeout: reason unknown.
    -4: Timeout: the printer is probably not connected.
    -5: Timeout: the printer is connected but probably not turned on.

The "IOCTL write" function sends a buffer of I/O control information to the printer. The data is written to the IOCTL channel instead of the data channel.
  Input:
    AX=8101 h
    DX=Printer port number (0 to 2 for LPT1 to LPT3)
    CX=Number of bytes to write
    DS:SI-->buffer to send
  On return.
    CX contains the number of bytes sent.
    Result code is in AX.
  If AX is
    0: Successfully sent.
    -1: Invalid printer port number or port not installed.
    -2: The pointer specified is NULL.
    -3: Timeout: reasons unknown.
    -4: Timeout: the printer is probably not connected.
    -5: Timeout: the printer is connected but probably not turned on.

The "read data" function reads a buffer of data from the printer.
  Input:
    AX=8200 h
    DX=Printer port number (0 to 2 for LPT1 to LPT3)
    CX=Maximum number of bytes to read
    ES:DI-->buffer area to store incoming data.
  On return.
    CX contains the number of bytes actually read.
    Result code is in AX.
  If AX is
    0: Successfully sent.
    -1: Invalid printer port number or port not installed.
    -2: The pointer specified is NULL.
    -3: Timeout: reason unknown.
    -4: Timeout: the printer is probably not connected.
    -5: Timeout: the printer is connected but probably not turned on.
    -6: Timeout: printer (probably) does not support the bidirectional protocol.

The "IOCTL read" function reads a buffer of I/O control information from the printer. The data is read from the I/O control channel instead of the data channel.
  Input:
    AX=8201 h
    DX=Printer port number (0 to 2 for LPT1 to LPT3)
    CX=Maximum number of bytes to read
    ES:DI--buffer area to store incoming data.
  On return.
    CX contains the number of bytes actually read.
    Result code is in AX.
  If AX is
    0: Successfully sent.
    -1: Invalid printer port number or port not installed.
    -2: The pointer specified is NULL.
    -3: Timeout: reason unknown.
    -4: Timeout: the printer is probably not connected.
    -5: Timeout: the printer is connected but probably not turned on.
    -6: Timeout: printer (probably) does not support the bidirectional protocol.

As a last extension, with respect to read/set timeout value for writes:
  Input:
    AH=83 h
    AL=0 to read, 1 to set DX=Printer port number (0 to 2 for LPT1 to LPT3)
BX=Timeout value in seconds for writes. 0 means infinite (no timeout). Default is 0 (no timeout).
CX=Timeout value in seconds for IOCTL writes. Default is 0.

Note: a Ctrl-Break sequence from the operator causes a timeout even if the timeout value is set to 0.

Note 2: This timeout value does not affect reads from either channel.

Those skilled in the art should now appreciate that the present invention provides a bidirectional parallel protocol that is robust, expandable, and well-suited to operate between a host computer and an attached printer. The protocol according to the teachings of the present invention can use existing PC parallel port hardware and cables but is transparent to ill-behaved application software and the like. Still further, the protocol according to the teachings of the present invention allows for rapid polling while not imposing problematic real-time constraints.

Those skilled in the art will recognize that many modifications and variations besides those specifically mentioned may be made in the techniques described herein without departing substantially from the concept of the present invention. Accordingly, within the scope of the appended claim, the present invention may be practiced otherwise than as specifically described herein.

What is claimed is:

1. A method of providing a reverse channel communication capability between a computer and a printer over a parallel interface, said method comprising the steps of:

a) providing, by said computer to said printer, a communication mode signal, said communication mode signal is for placing said printer in a communication mode;

b) providing, by said computer to said printer, a first signal indicating said communication mode signal is ready to be read;

c) providing, by said printer to said computer, a second signal indicating that said printer will provide a computer data in the communication mode indicated in step a);

d) providing, by said printer to said computer, a ready signal indicating that said second signal is ready to be read;

e) providing, by said computer to said printer, a third signal indicating that said computer is ready to receive a first data from said printer;

f) providing, by said printer to said computer, said first data;

g) providing, by said printer to said computer, a fourth signal indicating that said first data is ready to be read;

h) providing, by said computer to said printer, a fifth signal indicating that said computer is ready to receive more data;

i) providing, by said printer to said computer, a second data;

j) providing, by said printer to said computer, a sixth signal indicating that said second data is ready to be read.

2. The method of claim 1, wherein said first data is a low nibble.

3. The method of claim 2, wherein said second data is a high nibble.

4. The method of claim 1, wherein said communication mode is a reverse channel communication mode.

5. The method of claim 1, wherein said communication mode is an input/output control mode.

6. The method of claim 1, wherein said communication mode is a reverse channel nibble mode.

7. A method of turning around a parallel channel between a computer and a printer comprising the steps of:

a) indicating, by said computer to said printer, a mode of data transfer that is acceptable to said computer, said mode comprises a data format mode;

b) indicating, by said printer to said computer, that an acceptable mode of data transfer will be used by said printer;

c) indicating, by said computer to said printer, that data will be accepted on a turned around status line;

d) providing, by said printer to said computer on said turned around status line, data;

e) turning around said turned around status line so that status signal can be sent from said computer to said printer.

8. The method of claim 7, wherein said step d) comprises the steps of sending said data in at least two data nibbles.

9. The method of claim 7, wherein said mode of data transfer is a nibble mode.

* * * * *

UNITED STATES PATENT AND TRADEMARK OFFICE
CERTIFICATE OF CORRECTION

PATENT NO. : 5,666,558 Page 1 of 3
DATED : Sep. 9, 1997
INVENTOR(S) : Pipkins It is certified that error appears in the above-identified patent and that said Letters Patent is hereby corrected as shown below:

| | |
|---|---|
| Column 1, line 31 | Replace "modem," With --modems,-- |
| Column 1, line 34 | Replace "hard," With --hand,-- |
| Column 1, line 63 | Replace "cede" With --code-- |
| Column 2, line 36 | Replace "beck" With --back-- |
| Column 2, line 43 | Replace "my" With --may-- |
| Column 2, line 44 | Replace "my" With --may-- |
| Column 3, line 17 | Replace "beck" With --back-- |
| Column 5, line 15 | Replace "beck" With --back-- |
| Column 5, line 62 | Replace "Transfer" |

UNITED STATES PATENT AND TRADEMARK OFFICE
CERTIFICATE OF CORRECTION

PATENT NO.  : 5,666,558
DATED       : Sep. 9, 1997
INVENTOR(S) : Pipkins

It is certified that error appears in the above-identified patent and that said Letters Patent is hereby corrected as shown below:

With --Transfers--

Column 6, line 10       Replace "represent"
                                    With --represents--

Column 6, line 17       Replace "open"
                                    With --open.--

Column 8, line 1        Replace "SCLT"
                                    With --SLCT--

Column 8, Table 2,
  line 4                  Replace "Bit"
                                    With --bit--

Column 9, line 2        Replace "all's"
                                    With --all 1's--

Column 9, table line 25  Delete "no"

Column 9, table line 27  Replace "red."
                                    With --read.--

UNITED STATES PATENT AND TRADEMARK OFFICE
CERTIFICATE OF CORRECTION

PATENT NO. : 5,666,558
DATED : Sep. 9, 1997
INVENTOR(S) : Pipkins

It is certified that error appears in the above-identified patent and that said Letters Patent is hereby corrected as shown below:

Column 9, table line 28   Replace "id"
                          With --if--

Column 9, line 64         Replace "stored"
                          With --restored--

Column 12, line 9         Replace "On return."
                          With --On return:--

Column 12, line 27        Replace "On return."
                          With --On return:--

Column 13, line 25        Replace "claim."
                          With --claims,--

Signed and Sealed this

Fourteenth Day of July, 1998

Attest:

BRUCE LEHMAN

Attesting Officer    Commissioner of Patents and Trademarks